United States Patent [19]

Baumann

[11] Patent Number: 5,682,333
[45] Date of Patent: Oct. 28, 1997

[54] MOTOR VEHICLE WHEEL SPEED BALANCING METHOD

[75] Inventor: Matthias Baumann, Boeblingen, Germany

[73] Assignee: Mercedes-Benz AG, Germany

[21] Appl. No.: 291,597

[22] Filed: Aug. 16, 1994

[30] Foreign Application Priority Data

Aug. 16, 1993 [DE] Germany ............... 43 27 491.9

[51] Int. Cl.⁶ ............................................. G01P 3/44
[52] U.S. Cl. ............ 364/565; 364/426.02; 364/426.03; 364/424.01; 180/197; 324/160; 324/166
[58] Field of Search ............... 364/426.02, 565, 364/426.03, 424.01; 303/102, 105, 97, 95; 180/197; 324/160, 166

[56] References Cited

U.S. PATENT DOCUMENTS

| | | | |
|---|---|---|---|
| 4,321,676 | 3/1982 | Ohmori et al. | 364/426 |
| 4,566,737 | 1/1986 | Masaki et al. | 303/189 |
| 4,718,013 | 1/1988 | Kubo | 364/426 |
| 4,961,476 | 10/1990 | White et al. | 180/197 |
| 5,016,179 | 5/1991 | Utzt | 364/426.02 |
| 5,019,984 | 5/1991 | Masaki et al. | 364/426.02 |
| 5,179,526 | 1/1993 | Zimmer et al. | 364/565 |
| 5,222,570 | 6/1993 | Kawamura et al. | 180/197 |
| 5,406,486 | 4/1995 | Kamio et al. | 364/426.03 |

FOREIGN PATENT DOCUMENTS

| | | |
|---|---|---|
| 4019886 | 6/1990 | Germany. |
| 4130370 | 9/1991 | Germany. |

OTHER PUBLICATIONS

British Search Report.

*Primary Examiner*—Kevin J. Teska
*Assistant Examiner*—Thai Phan
*Attorney, Agent, or Firm*—Evenson, McKeown, Edwards & Lenahan, P.L.L.C.

[57] ABSTRACT

A method balances wheel speeds for a motor vehicle having a wheel-slip control system. Quick coarse balancing with respect to a reference wheel are provided in stages and subsequent fine balancing in pairs of wheels, either on the same side or on the same axle. Cornering is not detected from the left/right deviation of an axle, but from the temporal variation in the differentiated left/right deviation to achieve a very sensitive and reliable wheel balancing.

20 Claims, 1 Drawing Sheet

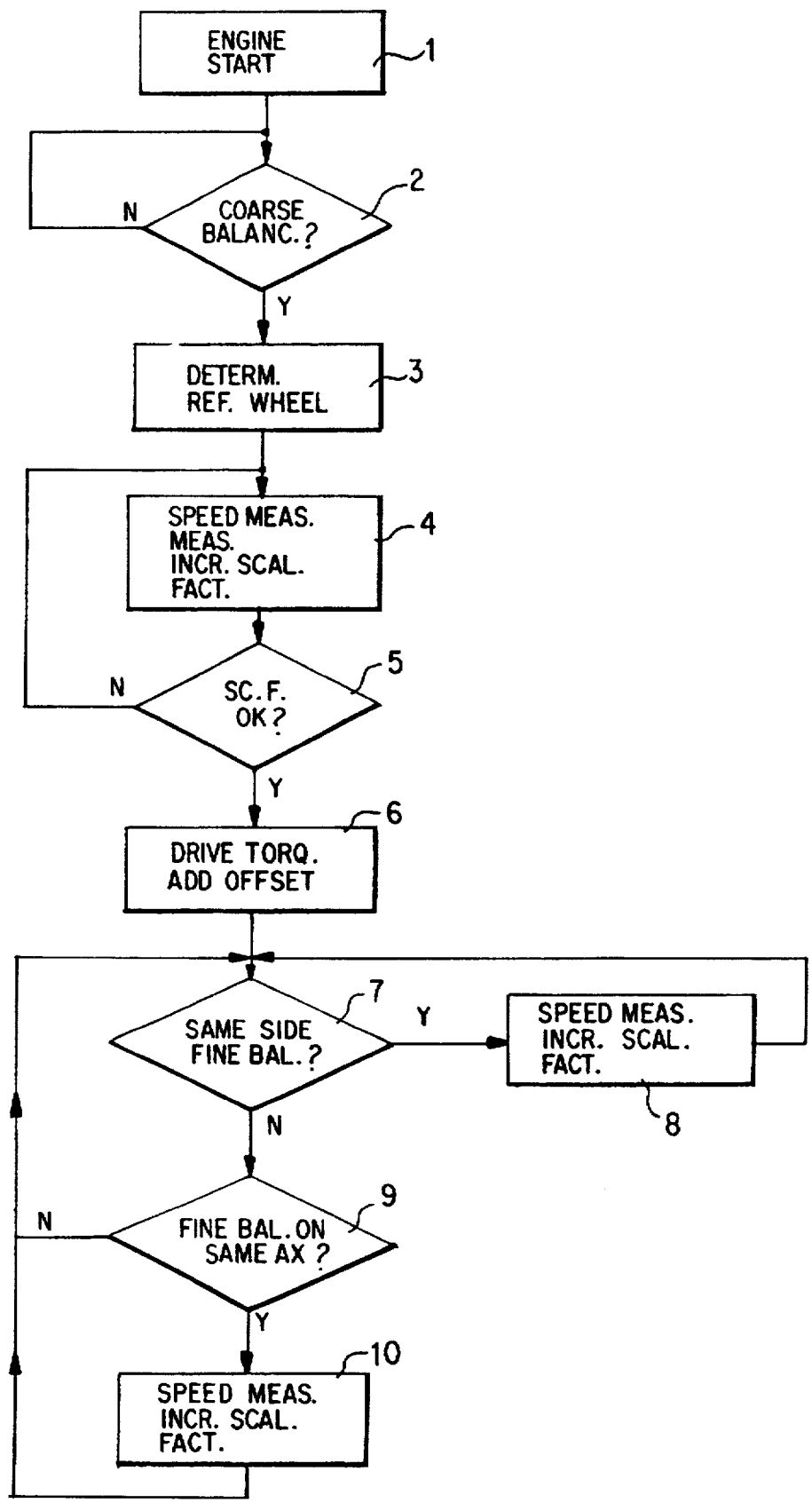

MOTOR VEHICLE WHEEL SPEED BALANCING METHOD

BACKGROUND AND SUMMARY OF THE INVENTION

The present invention relates to a method for balancing wheel speeds for a motor vehicle, particularly having a wheel-slip control system.

A need arises, particularly in the case of motor vehicles having wheel-slip control systems, for exact wheel speed balancing in order to be able to reliably inform the driver, via, for example, a driver information lamp, about the system state and driving condition. It is advantageous for such balancing also to be used in conjunction with built-in wheel-slip control systems such as anti-block systems (ABS) and traction slip controls (TSC). The imminent blocking or spinning of a wheel is usually detected in this case by the fact that the time or temporal change in the measured speed of the relevant wheel is no longer situated within a prescribable standard range. That is, with threatened wheel blocking and threatened wheel spinning, the wheel acceleration is respectively situated above an adjustable threshold value. The term "acceleration" is understood both as an actual, positive acceleration and as a retardation or negative acceleration.

In order to be able to detect the deviation from the standard, desired wheel-slip behavior as early and reliably as possible, control systems operating at high accuracy must take account of the fact that in the case of slip-free, purely rolling straight-ahead driving the speeds of the vehicle wheels are already not equal, for example because of production tolerances during tire manufacture, differing degrees of wear of the tires, and the like. Thus, given a driving speed of approximately 100 km/h, typical wheel speed differences in the percentage range already yield a deviation in the overall wheel speeds of approximately 1 km/h, a value which must be taken into account in the case of modern all-wheel and wheel-slip control systems. This purpose is achieved by a wheel speed balancing method, by way of which measured wheel speeds are conditioned, taking into account the different rolling circumferences of the individual wheels which are also subjected to continuous temporal variations, before they are evaluated by a control system, for example all-wheel drive and/or wheel-slip control system.

Offenlegungsschrift DE 41 30 370 A1 describes a single-stage wheel speed balancing method which is respectively activated when overshooting of a minimum speed, a sufficient amount of straight-ahead driving and an at most gentle vehicle acceleration are detected.

A two-stage wheel speed balancing method is described in Patent DE 40 19 886 C1. In a first stage, a first wheel balancing takes place when a sufficiently gentle vehicle acceleration, a sufficiently low vehicle speed and sufficiently gentle cornering are detected. This first stage is followed in a second stage by renewed wheel balancing when sufficiently gentle vehicle acceleration and sufficiently gentle cornering continue to be detected together with a sufficiently high vehicle speed. In this case, wheel balancing is performed in a first stage in pairs with wheels on the same side, and in the second stage with respect to a selected reference wheel.

An object of the invention is to provide a wheel speed balancing method which is substantially more reliable and operates with high accuracy.

The foregoing object has been achieved in accordance with the present invention by providing a wheel-slip balancing method in which speed scaling factors are determined for the wheels with the purpose of forming mutually matched corrected wheel speeds.

The first step is a quick coarse balancing with respect to a reference wheel, for example in a non-recurring fashion after an engine start, as soon as there is a sufficient measure of straight-ahead driving above a specific minimum speed and, at the same time, a sufficiently low vehicle acceleration value (which is understood, as mentioned above, also to include a negative acceleration value, that is to say a retardation value). Thereupon, a second step in the form of a fine balancing, which is regularly repeated during a drive, for example, of the vehicle wheels is carried out, specifically for two wheels in pairs between two wheels of one vehicle side or two wheels of one vehicle axle, depending on the driving condition detected.

Fine balancing is carried out between wheels on the same axle if, as a consequence of a higher drive torque, balancing of the rear wheels in relation to the respective front wheels on the same side cannot be carried out with sufficient exactitude. The speed scaling factors thus determined admit the formation of corrected, mutually matched wheel speeds by multiplying the respectively measured speed by the associated scaling factor.

According to one embodiment of the present invention, a permanent stipulation of the speed scaling factor for the reference wheel advantageously prevents the correction factors from gradually drifting off in one direction up to a limiting value.

Variable reference wheel selection advantageously ensures that balancing is respectively carried out with respect to an average speed. In contrast to rigid or fixed systems which balance with respect to a permanently prescribed wheel (for example, the non-driven left-hand or right-hand wheel), variable reference wheel selection is not attended by the risk that three relatively identically rotating, "good" wheels are balanced with respect to a "bad" wheel deviating strongly therefrom such as for example, an emergency wheel mounted at the reference wheel position.

According to yet another advantageous feature of the present invention, the quickly calibrating coarse balancing is, as the case may be, carried out recursively and terminated when the deviation of the instantaneously valid scaling factors all remain below a prescribable limiting value with respect to their temporally continuously varying desired value. This limiting value is, on one hand, small enough already to obtain fairly exact wheel speed balancing, but, on the other hand, is selected sufficiently large to be able to terminate coarse balancing in a comparatively short time. Matching of the scaling factors must be performed continuously and is not permitted to overshoot maximum prescribable amounts of variation per prescribable time unit. However, the corrected wheel speeds used in a wheel-slip control system are influenced by the new scaling factors valid from one program cycle to the other such that the controlled variables determined from the corrected wheel speeds overshoot specific control thresholds.

A presently preferred embodiment of the invention adds on, upon termination of quick coarse balancing, an offset amount for the rear wheel scaling factors, which takes account of a rear wheel drive slip possibly present during coarse balancing in the case of a relatively high drive torque. Fine balancing is likewise carried out recursively and continuously during driving if the corresponding driving conditions obtain.

In the case of the, preferably recursive, matching of the scaling factors to respectively newly measured wheel speeds, deviations of the newly calculated scaling factors from the previous ones are determined, and the previous scaling factors are brought to the newly calculated values by steps as a function of these differences. This prevents short term fluctuations in the scaling factors, which are, for example, caused by roadway influences. In this situation, the newly calculated scaling factor values are respectively yielded from the quotient of the measured speeds of the two wheels which are in the process of being balanced relative to one another.

According to yet a further aspect of the present invention, balancing of the rear wheels with respect to their front wheels on the same side is carried out for fine balancing in the normal case if, in particular, no excessively large drive torque is active. In the case of no excessively large drive torque, the wheels of each axle are then balanced relative to one another in pairs, since a larger drive torque would lead to defective wheel speed balancing between wheels on the same side.

Use can be made not, as customary, only of the left/right deviation itself, but of the temporally differentiated left/right deviation obtained from the temporal deviation obtained thereof for the purpose of detecting sufficiently gentle cornering, which can be, in particular straight-ahead driving completely free from curves. This prevents faulty detection based on a stationary wheel circumference difference of the two wheels, for example on the basis of the mounting of wrong wheels and, owing to the exclusion of this possible source of error, permits the selection of a comparatively small limiting value, that is the detection of a large amount of straight-ahead driving.

BRIEF DESCRIPTION OF THE DRAWINGS

These and other objects, features and advantages of the present invention will become more readily apparent from the following detailed description thereof when taken in conjunction with the accompanying sole FIGURE which is a flow diagram of a wheel speed balancing method according to the present invention for a motor vehicle having a wheel-slip control system.

DETAILED DESCRIPTION OF THE DRAWING

The wheel speed balancing method of the present invention is used for a motor vehicle having a wheel-slip control system in which the need arises for sensitive wheel balancing for the purpose of actuating a driver information lamp which informs the driver of the current driving condition.

The method begins after an engine start (step 1) with quick calibration, carried out non-recursively, for the purpose of coarsely balancing the wheel speeds. Tire rolling radii which deviate strongly from the standard rolling radius such as, for example, during the use of an emergency spare wheel or in the case of mounting a tire of the wrong size, are corrected thereby. By way of introduction, an interrogation is made as to whether conditions expected for coarse balancing are fulfilled (step 2), with the following conditions being monitored: absence of a braking process, detected from monitoring the brake light contact; overshooting of a minimum speed of 45 km/h; presence of a sufficient amount of straight-ahead driving detected from overshooting limiting values of differentiated left/right deviation signals of measured wheel speeds over a sufficiently long period of time, for example 4.58; and undershooting limiting values of the vehicle acceleration, for example below 0.5 m/s$^2$, detected by determining the average rear axle wheel acceleration.

If one of these conditions is not fulfilled, a new interrogation is made. The abovementioned coarse balancing conditions ensure the detection of driving on µ-split roadways or of aquaplaning points, so that the quick calibration for coarse balancing is halted.

Finally, if a driving condition fulfilling all the coarse balancing conditions is reached, the first step is to determine a reference wheel which is used for balancing purposes (step 3). For this purpose, the four wheel speeds are measured, and their arithmetic average is formed. The wheel with the speed which has the smallest deviation from this average value is selected as reference wheel. As mentioned above, this reference wheel selection avoids balancing with respect to an unfavorable wheel. The coarse balancing is also carried out in the case of an activated system intervention, for example braking intervention in the case of TSC or GDB (regulated differential brake in which the slipping wheel is braked down to vehicle speed using the present wheel brake instead of locking the differential), engine torque intervention in the case of TSC, central locking activation in the case of all-wheel drive, and the like. The quick coarse balancing with respect to a selected reference wheel is logical, since the influence of the drive torque on the dynamic tire rolling circumference is smaller in the relevant range than the influence of tires for mixed and extreme conditions.

Thereafter the next step is taken (step 4), in which the actual scaling factor determination is carried out within the framework of quick coarse balancing. The first step for this purpose is to prescribe initial values for the scaling factors. The reference wheel is set in this case to a constant, permanently prescribed scaling factor initial value, with the result that there is a constant orientation of all the wheel speeds to a fixed value in order, as mentioned above, to prevent a gradual drifting away of the correction factors. The effect of this is that repeated, unfavorable changing to and fro of unfavorable tires does not escalate the scaling factors as far as prescribed minimum or maximum values. The remaining three initial scaling factors are assumed as far as possible from preceding wheel speed balancing, so that the fresh coarse balancing can be terminated as quickly as possible. For this purpose, four instantaneous scaling factors are stored after an engine stop in each case. If the previous values are not available, all the scaling factors can alternatively be set initially to the same initial value.

After stipulation of initial scaling factors, the wheel speeds are now determined. After suitable filtering, a determination is made of scaling factors which belong to the measured wheel speed and are referred to the reference wheel and which are yielded from the quotient of the reference wheel speed and the speed of the wheel under consideration. After filtering of these scaling factors which have been determined, for each wheel the difference is formed between the still valid scaling factor and the scaling factor determined, and this difference is likewise subjected to filtering. Subsequently, the new scaling factor is formed by incrementally increasing or decreasing the still valid, previous scaling factor for each wheel, with the direction of the stepwise change in value being yielded from the sign of the scaling factor difference determined. In this case, it is possible for the purpose of increasing the rate of calibration to select instead of an increase by 1 a higher increment which is set in terms of absolute value to a fraction of the difference determined, so that the rate of calibration rises with higher instantaneous deviation and is reduced to the desired value with an increasing approximation after a plurality of program cycles. In a typical application, in which the permanently prescribed scaling factor is set to the value of 10,000, the higher increment is selected, for example, as the next integer above one twenty-fifth of the difference determined.

The possibly recursive behavior is generated by a subsequent interrogation (step 5) in which it is established for each wheel whether the difference determined between the scaling factor determined by the wheel speed and the scaling factor previously present does not overshoot in terms of absolute value a prescribed maximum value which, for example, amounts to 0.1% deviation with respect to the permanently prescribed initial wheel speed. If overshooting occurs for at least one wheel, a return is made to before step 4, after which renewed wheel speed measurement and, subsequently, a renewed incremental change in scaling factor are undertaken. If all the differences determined are below the prescribed value, quick coarse balancing is terminated. In order not to "calibrate away" any existing drive slip of the rear wheels at the end of quick coarse balancing, an offset value dependent on engine torque is subsequently added to the two rear wheel scaling factors, for example the scaling factors are raised by 0.4% if the drive torque amounts to +1,000 Nm and are reduced by 0.2% if the drive torque amounts to −500 Nm (step 6).

After this non-recurring measure of coarse balancing after an engine start, an interrogation is subsequently made (step 7) as to whether the conditions are present for fine balancing of the rear wheels with respect to the front wheels on the same side. Assumed for this purpose are: driving which is virtually free from drive torque at a speed of more than 45 km/h (so that, when cornering, a front axle/rear axle Ackermann correction is no longer required); cornering which is not excessive, for example steering angle of less than 50°; no brake actuation, detected via the braking light contact; and no excessive vehicle acceleration or non-stationary cornering of the vehicle.

If it is detected that all the above conditions are observed in this interrogation step, the actual fine balancing determination of the scaling factors (step 8) is begun. For this purpose the rear wheel speeds are firstly measured again, the values obtained are filtered and scaling factors for the rear wheels are determined therefrom, which scaling factors are yielded from the quotient of the corrected speed of the front wheel on the same side and the measured speed of the rear wheel. After filtering these determined rear wheel scaling factors, the difference between the previously present rear wheel scaling factors and those freshly or most recently determined is formed in turn and subjected to filtering. Thereafter, a fine incremental increase in the previous, still valid respective rear wheel scaling factor takes place in a direction prescribed by the sign of the difference determined.

The fineness of this balancing by comparison with the coarse balancing described above can be seen from an example in which in the case of coarse calibration there is a step increase of at least one unit per ten program cycles at 15 ms, while in the case of fine balancing matching is performed by one unit per 100 program cycles at 15 ms in this case. In a typical example, it is possible in the case of this fine calibration at a driving speed of 50 km/h to correct the wheel to be calibrated in one minute by 0.2 km/h (i.e., by 0.4%/min). After the incrementation of the rear wheel scaling factors, which can, as already mentioned, be performed in the direction of larger or, as actual decrementation, smaller scaling factor values, these new valid rear wheel scaling factors are used to form corrected rear wheel speeds, specifically respectively as the product of the measured rear wheel speed and the new valid scaling factor of the relevant rear wheel. The corrected rear wheel speeds, finely balanced with respect to the front wheels on the same side, are present for the rear wheels after filtering of these values. Thereupon, a return is made to before the fine balancing interrogation step in order to initiate renewed fine balancing and in this way to have present continuously balanced wheel speeds. Alternatively, it is possible to repeat the fine balancing only at relatively long intervals.

If it is established in the interrogation step for fine balancing on the same side that at least one of the conditions is not met, an interrogation is made in the next step (step 9) as to whether mutual fine balancing of the wheels on the same axle, that is to say on the left-hand front relative to the right-hand front and of the left-hand rear relative to the right-hand front wheels, is possible. In contrast to fine balancing on the same side, such fine balancing is also possible given the occurrence of a relatively large drive torque and thus rear axle crown wheel torque. The further conditions essentially correspond to those for fine balancing on the same side, although only a smaller amount of cornering is permitted. In this case, a steering angle of 20° is initially permitted, and is reduced successively down to 3° after repeated overshooting of the scaling factors.

If one of the interrogated conditions is not met, the method returns to the stage before the interrogation for fine balancing on the same side. If it is detected that the conditions are met, the actual fine balancing of the front left-hand wheel relative to the front right-hand one and, at the same time, of the rear left-hand wheel relative to the rear right-hand one are carried out (step 10). For this purpose, a start is made by measuring the speeds of the two left-hand wheels, the values obtained are filtered, and used to determine associated scaling factors for these wheels byway of the quotient of the corrected speed of the associated right-hand wheel and the measured speed of the left-hand wheel. After filtering of the new scaling factors for the left-hand wheels, the differences between previously present scaling factors and those determined for the left-hand wheels are calculated in turn in the way described above, and these difference values are filtered.

Subsequently, the scaling factors of all the wheels are incrementally increased or reduced in the direction prescribed in each case by the deviation differences determined. These new, now valid scaling factors are used to determine the corrected wheel speeds anew as the product of the previous wheel speeds and their new scaling factors. Thus, in contrast to fine balancing on the same side, the scaling factors of the two wheels to be balanced are moved up towards one another incrementally in the case of fine balancing on the same axle. This yields in conjunction with the same increment a higher calibration rate of, for example, 0.8%/min. That is, it is possible in the case of a driving speed of 100 km/h to correct a front or rear axle left/right deviation by 0.8 km/h.

After termination of the fine balancing on the same axle, a return is made to the stage before the interrogation for fine balancing on the same side, as a result of which the program of the method is inherently closed. It is not explicitly represented that, as already mentioned above, in the event of a later engine stop the wheel speed scaling factors present are stored, in order to serve after a later renewed engine start as initial values for coarse balancing. Moreover, suitable safety thresholds are integrated into the program of the method of the present invention, for example minimum and maximum values for the scaling factors in order to intercept any errors in measurement and calculation.

The method of the present invention permits quick and precise wheel speed balancing. One program cycle including detection of the measured values, filtering and calculation of the variables lasts 15 ms or shorter. In the case of vehicles with automatic transmissions, the drive torque, (i.e., the rear axle crown wheel torque), is determined via the turbine torque, for which purpose the engine torque, if present, is detected directly or the turbine torque is calculated from the throttle angle, engine speed and converter characteristics map. The steering wheel angle is determined from the left/right deviation of the front wheels and the vehicle reference speed, for which purpose the front wheel speeds are correspondingly conditioned.

The algorithm described delivers a wheel speed balancing accuracy of, at most, 0.1% deviation between all the four wheel speeds corrected by the speed scaling factors in conjunction with slip-free rolling. The wheel speed balancing method can be used with slight modifications in vehicles having different tire slip control systems, such as ABS, TSC, SMR (fast torque regulation on longitudinal dynamic behavior regulation systems) and GDB.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for balancing speeds of wheels of a motor vehicle having a wheel-slip control system, comprising the steps of (a) making a coarse-step determination of scaling factors by carrying out quick coarse balancing with respect to a reference wheel where cornering below a preset cornering threshold value, overshooting of a vehicle speed above a preset minimum vehicle speed and vehicle acceleration below a preset threshold value have been detected, and (b) thereafter, making a fine-step determination of the scaling factors by carrying out one of fine balancing of each wheel of an axle with respect to the wheel on the same side of another axle when drive torque below a present torque threshold value and overshooting of the vehicle speed below the present threshold value are detected, and of fine balancing each wheel on one side with respect to the opposite wheel on the same axle when relatively drive torque above a preset threshold value, cornering above the present cornering value and overshooting of the vehicle speed above the preset minimum vehicle speed are detected, such that mutually matched corrected wheel speeds are formed in the vehicle.

2. The method according to claim 1, wherein step (a) for making the coarse-slip determination comprises (a') first selecting a wheel as a reference wheel and setting a speed scaling factor thereof to a permanently prescribed value, and thereafter (a") measuring the speeds of the wheels, and determining new speed scaling factors from previous speed scaling factors as a function of the quotient of the measured speed of each wheel to that of the reference wheel, and determining coarsely corrected speeds for the wheels.

3. The method according to claim 2, wherein in step (a') the speeds of the wheels are measured non-recursively, and the wheel having the smallest speed deviation from an arithmetic average value of the measured wheel speeds is selected as the reference wheel.

4. The method according to claim 2, wherein step (a") is repeated until all deviations of the new speed scaling factors from the previous speed scaling factors undershoot a prescribed limiting value.

5. The method according to claim 4, wherein, in step (a'), the speeds of the wheels are measured non-recursively, and the wheel having the smallest speed deviation from an arithmetic average value of the measured wheel speeds is selected as the reference wheel.

6. The method according to claim 2, wherein, at the end of the quick coarse balancing, an offset amount dependent on drive torque is added to the new speed scaling factors for the rear wheels.

7. The method according to claim 6, wherein, in step (a'), the speeds of the wheels are measured non-recursively, and the wheel having the smallest speed deviation from an arithmetic average value of the measured wheel speeds is selected as the reference wheel.

8. The method according to claim 7, wherein step (a") is repeated until all deviations of the new speed scaling factors from the previous speed scaling factors undershoot a prescribed limiting value.

9. The method according to claim 1, wherein, in step (b), the speed of one wheel is measured and the new speed scaling factors are determined from the previous speed scaling factors as a function of the quotient of the speed of the one wheel, measured during fine balancing, to the speed of the other wheel, determined during coarse balancing, and finely corrected speeds are determined therefrom for the two wheels.

10. The method according to claim 9, wherein the step (a) for making the coarse-slip determination (a') comprises first selecting a wheel as a reference wheel and setting a speed scaling factor thereof to a permanently prescribed value, and thereafter (a") measuring the speeds of the wheels, and determining new speed scaling factors from previous speed scaling factors as a function of the quotient of the measured speed of each wheel to that of the reference wheel, and determining coarsely corrected speeds for the wheels.

11. The method according to claim 10, wherein, in step (a'), the speeds of the wheels are measured non-recursively, and the wheel having the smallest speed deviation from an arithmetic average value of the measured wheel speeds is selected as the reference wheel.

12. The method according to claim 11, wherein step (a") is repeated until all deviations of the new speed scaling factors from the previous speed scaling factors undershoot a prescribed limiting value.

13. The method according to claim 12, wherein at the end of the quick coarse balancing, an offset amount dependent on drive torque is added to the new speed scaling factors for the rear wheels.

14. The method according to claim 9, wherein, in step (b), the rear wheels are finely balanced with respect to the front wheels on the same side of the vehicle, and the speed scaling factors of the front wheels, determined from coarse balancing, are kept constant whereas the speed scaling factors of the rear wheels are freshly determined.

15. The method according to claim 14, wherein, for determining the new speed scaling factors, the previous speed scaling factors are increased incrementally in a direction towards scaling factor values which are yielded from the quotients from the measured wheel speeds of two wheels under consideration.

16. The method according to claim 9, wherein, in step (b), during fine balancing of the speeds of wheels on the same axle, new speed scaling factors are determined from the previous ones for both wheels by respective incremental change in the two previous speed scaling factors towards one another.

17. The method according to claim 16, wherein, for determining the new speed scaling factors, the previous speed scaling factors are increased incrementally in a direction towards scaling factor values which are yielded from the quotients from the measured wheel speeds of two wheels under consideration.

18. The method according to claim 17, wherein, in step (b), the rear wheels are finely balanced with respect to the front wheels on the same side of the vehicle, and the speed scaling factors of the front wheels, determined from coarse balancing, are kept constant whereas the speed scaling factors of the rear wheels are freshly determined.

19. The method according to claim 1, wherein, for determining the new speed scaling factors, the previous speed scaling factors are increased incrementally in a direction towards scaling factor values which are yielded from the quotients from the measured wheel speeds of two wheels under consideration.

20. The method according to claim 1, wherein, for detecting an amount of cornering, the speeds of the left-hand wheel and the right-hand wheel of one axle are determined as a function of time, a respective left/right deviation is determined and the time dependence thereof is differentiated, and at most gentle cornering is concluded when the differentiated left/right deviation undershoots a prescribable limiting value.

* * * * *